US005542626A

United States Patent [19]
Beuck et al.

[11] Patent Number: 5,542,626
[45] Date of Patent: Aug. 6, 1996

[54] MULTI-DECK PASSENGER AIRCRAFT HAVING IMPACT ENERGY ABSORBING STRUCTURES

[75] Inventors: Guenter Beuck; Hans-Juergen Mueller; Ralf Schliwa, all of Bremen, Germany

[73] Assignee: Deutsche Aerospace Airbus GmbH, Hamburg, Germany

[21] Appl. No.: 232,387

[22] Filed: Apr. 25, 1994

[30] Foreign Application Priority Data

Apr. 26, 1993 [DE] Germany ............................ 43 13 592.7

[51] Int. Cl.⁶ .......................... B64D 45/04; B64C 35/02; B64C 1/10
[52] U.S. Cl. .......................... 244/107; 244/105; 244/119; 244/121
[58] Field of Search ................................ 244/105, 167, 244/108, 118.5, 119, 120, 121

[56] References Cited

U.S. PATENT DOCUMENTS

| | | | |
|---|---|---|---|
| 2,494,445 | 1/1950 | Moeller | 244/105 |
| 2,609,068 | 9/1952 | Pajak | 244/119 |
| 3,104,084 | 9/1963 | Lovercheck | 244/108 |
| 3,151,712 | 10/1964 | Jackson | 244/119 |
| 3,251,076 | 5/1966 | Burke | 297/216.1 |
| 3,638,992 | 2/1972 | Forshee | 244/119 |
| 4,593,870 | 6/1986 | Cronkhite et al. | 244/119 |
| 4,923,145 | 5/1990 | Broadhurst | 244/107 |
| 5,086,996 | 2/1992 | Roeder et al. | 244/118.5 |

FOREIGN PATENT DOCUMENTS

| | | |
|---|---|---|
| 381655 | 9/1923 | Germany. |
| 2826619 | 12/1979 | Germany. |
| 4116524 | 11/1992 | Germany. |

OTHER PUBLICATIONS

"Crashsimulationsrechnungen und Bauteilidealisierung fuer einen Luftfahrzeugunterboden" (Crash Simulation Calculations and Component Idealization for an Aircraft Subfloor Section), Z. Flugwiss. Weltraumforsch. 11 (1987) 221–229, pp. 221–229.

*Primary Examiner*—Andres Kashnikow
*Assistant Examiner*—Virna Lissi Mojica
*Attorney, Agent, or Firm*—W. G. Fasse; W. F. Fasse

[57] ABSTRACT

An energy absorbing structural unit is attached outside the fuselage belly of an aircraft having at least two decks arranged one over another. At least the lower deck, of which the floor is adjacent to the fuselage belly, includes passenger cabin compartments and/or service facilities. The energy absorbing structure is an energy absorbing structural unit (5) that is attached outside of the existing aircraft fuselage (2) approximately vertically below the passenger cabin compartment (9) and/or service facilities provided on the lower deck of the aircraft. The energy absorbing structural unit absorbs impact energy arising in a crash or emergency landing of the aircraft. Because impact energy is absorbed by the external structural unit rather than or in addition to the structure of the aircraft fuselage and air frame, it is possible to provide lower deck passenger cabin space that may be continuously occupied by passengers and crew even during the take-off and landing phases of a flight. In this manner it is possible to increase the passenger capacity of an aircraft.

34 Claims, 4 Drawing Sheets

MULTI-DECK PASSENGER AIRCRAFT HAVING IMPACT ENERGY ABSORBING STRUCTURES

FIELD OF THE INVENTION

The invention relates to a passenger aircraft, especially a multi-deck aircraft having at least two decks arranged one above the other with this floor of the lower deck being adjacent to the fuselage belly, wherein passenger cabin spaces and/or service facilities are arranged on the lower deck, and wherein at least one energy absorbing structure is provided in the area of the fuselage belly.

BACKGROUND INFORMATION

Aircraft manufacturers are intensively occupied by efforts to increase the passenger transport capacity of passenger aircraft, due to the ever-increasing volume of air passenger traffic. Thus, large capacity aircraft have become known, in which the space of several decks arranged one above another can be utilized for passenger cabin space and service facilities. For example, German Patent Publication 4,116,524 describes an aircraft having not only an upper and a main deck, but also a lower deck having a floor adjacent the fuselage belly. This lower deck is also to be used by passengers Thus, in addition to the freight containers arranged in a portion of the lower deck, modules are also provided which enclose sleeping cabins or other passenger cabins, for example, having seating arrangements and/or service facilities such as service galleys or restrooms installed therein.

Disadvantageously, however, the passenger modules provided on the lower deck according to the prior art can only be used by passengers during the cruise flight portion of a flight, and not during take-off and landing phases of a flight. The use of such a lower deck by passengers during take-off and landing has been prohibited by strict regulations regarding passenger safety in the event of a crash or emergency landing of the aircraft. A substantial disadvantage of the prior art provision of passenger modules on a lower deck is seen in that the lower deck cannot be used by the passengers at all times during a flight. Thus, the total passenger capacity of the aircraft is not effectively increased, but rather remains limited to the seating capacity of the main passenger decks during the take-off and landing. The prior art arrangements of aircraft decks suffer this disadvantage because it has not been suggested how to provide sufficient safety for the passengers in the lower deck during the take-off and landing phase of a flight, especially because the impact energy of a crash or emergency landing of an aircraft was substantially only absorbed by deformation of the lower fuselage structure, namely the fuselage belly. In the case of a crash or emergency landing, the fuselage belly and the underfloor structure of a lower deck collapses upward, whereby hardly any space remains within the lower deck to allow survival of the passengers. Serious injury and death of the passengers cannot be avoided. For this reason, it has not previously been possible to provide a lower deck that can be continuously occupied by passengers and passenger service facilities during all phases of a flight.

OBJECTS OF THE INVENTION

In view of the above it is the aim of the invention to achieve the following objects singly or in combination:

to increase the potential useable capacity of a passenger aircraft of the above mentioned type in such a manner that passenger cabins or service facilities located in a lower deck can also be occupied by passengers and crew members during the take-off and landing phases of a flight;

to construct and equip such an aircraft to provide an increased survival space for the passengers in the lower deck in the event of a crash or emergency landing;

to provide an impact energy absorbing structural unit to be attached to the outside of the existing aircraft fuselage below the lower deck area;

to provide strengthened walls, floors and/or ceilings of a lower deck cabin to help maintain the integrity of the lower deck cabin space in the event of a crash or emergency landing;

to construct such an energy absorbing structural unit in a lightweight and aerodynamically efficient manner while still achieving a sufficient absorption of kinetic energy in the event of a crash or emergency landing; and to provide such an energy absorbing structural unit that can be specifically tailored or particularly installed on different aircraft having different configurations, to provide energy absorption and protection only in those areas of a lower deck to be occupied by passengers or service facilities.

SUMMARY OF THE INVENTION

The above objects have been achieved in a multi-deck passenger aircraft having energy absorbing structures according to the invention, wherein each energy absorbing structure is particularly embodied as a structural unit that is attached to the outside of an aircraft fuselage in a location or locations substantially vertically beneath the passenger cabin spaces and/or service facilities including kitchen galleys and restroom facilities, for example, provided in the lower deck of the aircraft. Through the use of the invention, it is achieved that the lower deck of a passenger aircraft can be continuously used or occupied by people, that is to say, even during the take-off and landing phases of flight. The invention can also be applied to single deck passenger aircraft, wherein the passenger cabin deck is substantially adjacent the fuselage belly with no hold space, such as a cargo hold, below the passenger cabin.

The impact energy arising during a crash or emergency landing is absorbed in a controlled manner by the energy absorbing structural unit, whereby the chances of survival of the people on board are considerably increased because a greater survival space is maintained within the cabin of the lower deck. This is further ensured if a passenger compartment wall module is arranged within the lower deck to enclose and provide structural integrity to the passenger cabin of the lower deck. In this manner, the potential useful capacity of a passenger aircraft is substantially increased.

According to further detailed aspects of the invention, the energy absorbing structural unit essentially comprises an upper pan member, which is shaped to match or fit with the outer contour of the fuselage belly and a lower pan member, which is shaped to have a streamlined outer contour. A damping packet or damping core structure is enclosed between the upper and lower pan. The entire structural unit is attached to the fuselage belly, for example, by means of screws, glue, rivets, welding, or the like. With this arrangement of the energy absorbing structural unit, it is possible to attach the energy absorbing unit to the fuselage of an existing aircraft already in service. Thus it becomes possible to after-equip or re-fit existing aircraft with passenger cabins and service spaces in a variable or adjustable manner in the lower deck space below the main deck.

Preferably, each of the upper and lower pan members is constructed of an upper and lower cover layer enclosing an energy absorber element which is, for example, a vertical web profile or corrugated component. A lightweight composite material such as a honeycomb core material is fitted between adjacent webs or corrugations of the vertical web profile component. The hollow honeycomb cores are preferably axially directed in the load bearing direction substantially perpendicular to the lengthwise axis of the aircraft.

A sliding layer forming a skid pan may be arranged on the outer cover layer of the lower pan member. The sliding layer or skid pan allows the aircraft to slide in a controlled manner on its underbelly in the event of a crash or emergency landing. The skid pan preferably comprises fiber composite plies, including carbon fiber reinforced composite plies, as well as an outer aluminum-coated fiber reinforced composite layer.

The damping packet or damping core structure within the energy absorbing structural unit is essentially made of a plurality of energy absorber elements arranged between the upper and lower pan members. The absorber elements may be stiffened laterally by woven web bands which are, for example, preferably carbon fiber reinforced or glass fiber reinforced layers. A supporting material such as foam or honeycomb core material can be arranged in hollow spaces between adjacent absorber elements within the energy absorbing structural unit. Such a construction according to the invention assures that the energy absorbing unit has a relatively low total weight while simultaneously assuring an efficient absorption of kinetic energy arising in the event of a crash or emergency landing.

Various components that are installed in the aircraft fuselage as necessary for the various systems of the aircraft, are not affected or hindered in their function by the installation of the energy absorbing structural unit according to the invention. This is ensured because cut-outs or openings can be provided in the energy absorbing unit as required by the various aircraft components. Auxiliary attachments or components of aircraft systems, such as an outer surface cooler, can also be attached or integrated into the energy absorbing structural unit.

An additional energy absorbing module can be arranged according to the invention within the aircraft fuselage. Such an energy absorbing module preferably includes an energy absorbing floor underlayment provided on or in the lower deck floor or a structure stiffening and strengthening element incorporated into the aircraft floor. Such an energy absorbing module provided within the aircraft fuselage and substantially vertically below the floor of a lower deck passenger cabin can absorb at least a portion of the impact energy arising in the event of a crash or emergency landing. This serves to remove some of the impact loading from the energy absorbing structural unit attached to the outside of the fuselage.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
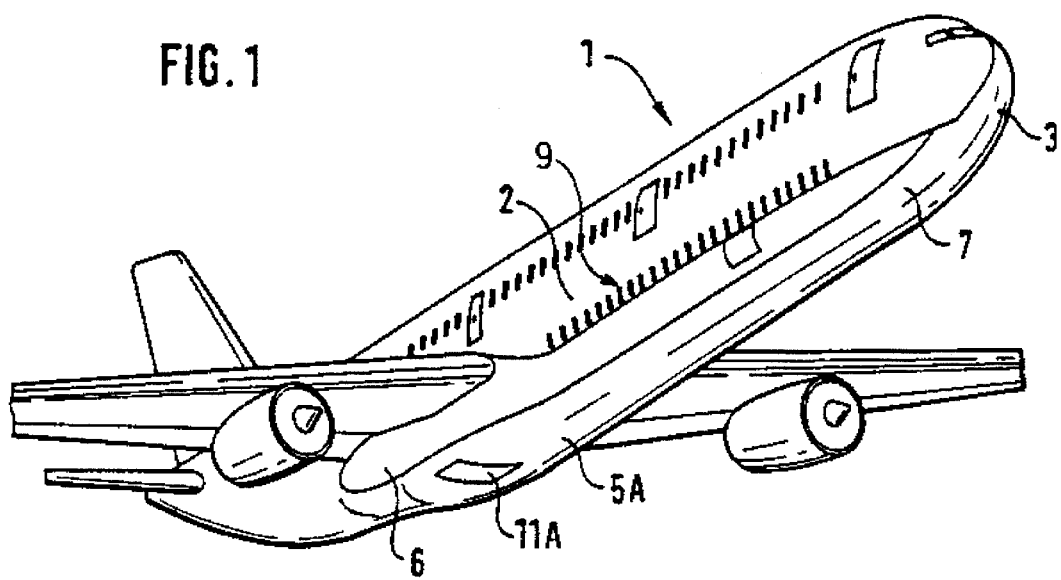
FIG. 1 is a perspective front view of a passenger aircraft having an energy absorbing structural unit according to the invention.
Figure 2:
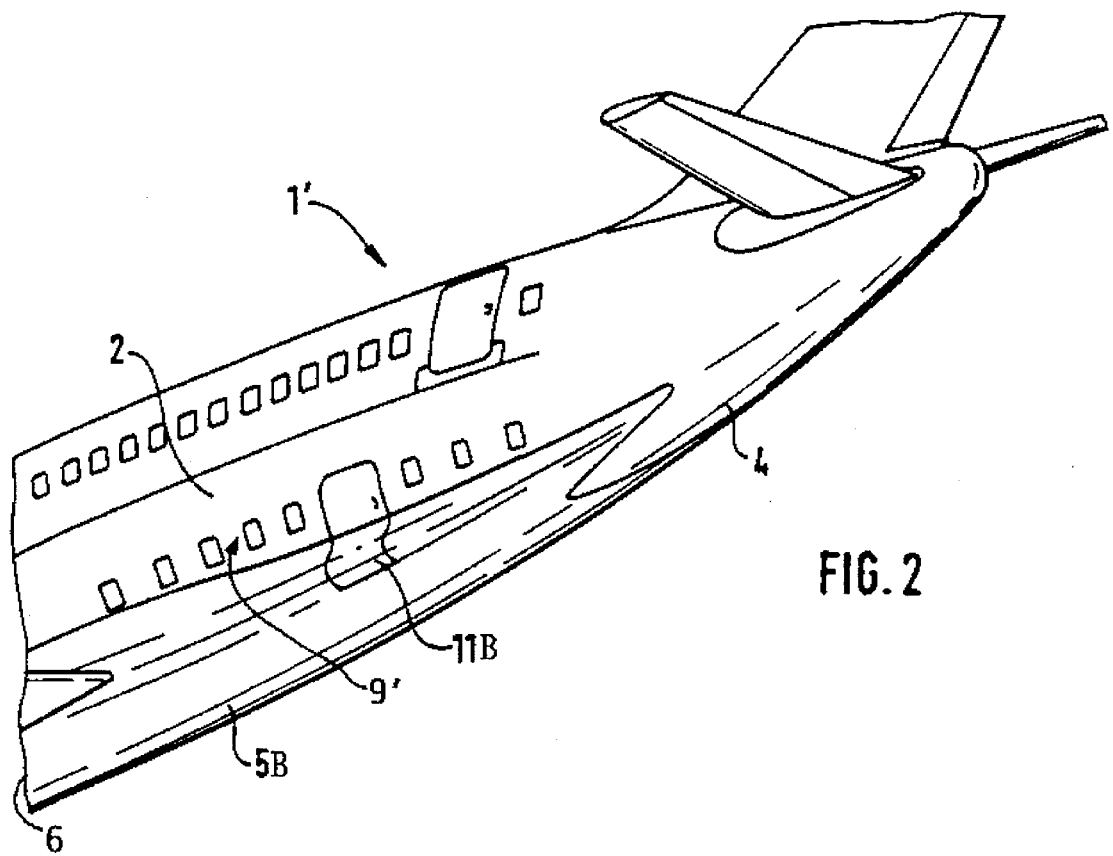
FIG. 2 is a rear perspective view of the tail portion of another aircraft having an energy absorbing structural unit according to the invention.

FIGS. 1 and 2 show two possible general arrangements of the energy absorbing structural unit 5 on a passenger aircraft 1 according to the invention. The preferred arrangement of the energy absorbing structural unit 5 on a portion or different portions of the lower area of the aircraft fuselage is essentially dependent on the arrangement of the passenger cabin spaces within the lower deck of the passenger aircraft 1. More specifically, the energy absorbing structural unit 5 is to be arranged substantially vertically beneath the areas of the lower deck in which passenger cabins and/or service facilities such as galleys, restrooms and the like are provided. In this manner, impact loads arising in the event of a crash or emergency landing are taken up in a direction substantially perpendicular to the lengthwise axis of the aircraft, whereby the impact energy is absorbed in a controlled manner. It is, of course, most important to bear the impact loads and absorb the impact energy in the areas of the lower deck that provide passenger cabin space.

As a specific example of the above described general concept, FIG. 1 shows a passenger aircraft 1 having an energy absorbing structural unit 5A attached to the aircraft fuselage 2 on a forward portion of the fuselage. Specifically, the structural unit 5A extends substantially from the nose 3 substantially to the bulge or belly fairing 6 forming the main landing gear bay. The energy absorbing structural unit 5A is attached to the fuselage 2, more specifically in the area of the fuselage belly 7, in such a manner that the outer contour of the structural unit 5A forms a thicker or expanded belly pan of the existing fuselage 2 in an advantageously aerodynamically streamlined manner as is typical in aircraft technology. In this embodiment, the aircraft 1 has a lower deck including a passenger cabin 9 in a forward portion of the lower deck of the aircraft. The energy absorbing structural unit 5A is arranged underneath the passenger cabin 9 in the same forward portion of the existing fuselage structure of the aircraft. A rear portion of the lower deck of the aircraft comprises a freight storage compartment for which no additional impact energy absorption structures are provided, but for which impact energy is absorbed in a known manner by the aircraft fuselage and airframe structure.

In contrast to the embodiment shown in FIG. 1, FIG. 2 shows an aircraft 1' having a passenger cabin 9' provided in an aft portion of a lower deck. Correspondingly, in this embodiment the energy absorbing structural unit 5B is attached to the aircraft fuselage 2 under the area of the passenger cabin 9' extending substantially from the belly fairings 6 forming the landing gear bay, substantially to the tail portion 4 of the aircraft 1'. The outer contour of the energy absorbing structural unit 5B is shaped in an aerodynamically streamlined manner to smoothly transition to the remaining aircraft fuselage 2 not provided with an energy absorbing structural unit 5B, as has been described, for example, with reference to FIG. 1. As mentioned, this embodiment provides passenger cabins or compartments 9' in the lower deck of the aircraft 1' in an aft or tail portion of the aircraft. On the other hand, freight storage compartments are provided on the lower deck in the nose or forward portion of the aircraft. Thus, an extra absorption of impact energy is not required in the forward portion of the aircraft and any impact energy arising there in the case of a crash or emergency landing is absorbed in a typical manner by the aircraft fuselage and air frame.

A third embodiment is not shown in particular by a single figure, but can be understood taking FIG. 1 in conjunction with FIG. 2. In this third embodiment, the energy absorbing structural unit 5 is provided over the entire lower fuselage. That is to say, the energy absorbing structural unit extends over the lower fuselage from the nose arena 3 to the tail area 4. This embodiment would be used in practice when the expected impact energy to be absorbed is such that the energy absorbing structural unit 5 must be dimensioned in a manner to cover the entire fuselage belly. Such an embodiment would also be used when passenger cabin compartments are to be provided over the entire length of the lower deck, or in a forward portion as well as an aft portion of the lower deck.

In all of the embodiments according to the invention, as shown for example in FIGS. 1 and 2, the energy absorbing structural unit 5 is constructed in such a manner so as not to interfere with the components and arrangements of the various aircraft systems, for example, the landing gear doors, access hatches into the fuselage or emergency escape doors. This is shown, for example, by the cat-outs or openings 11A and 11B provided in the energy absorbing structural unit 5.

Figure 3:
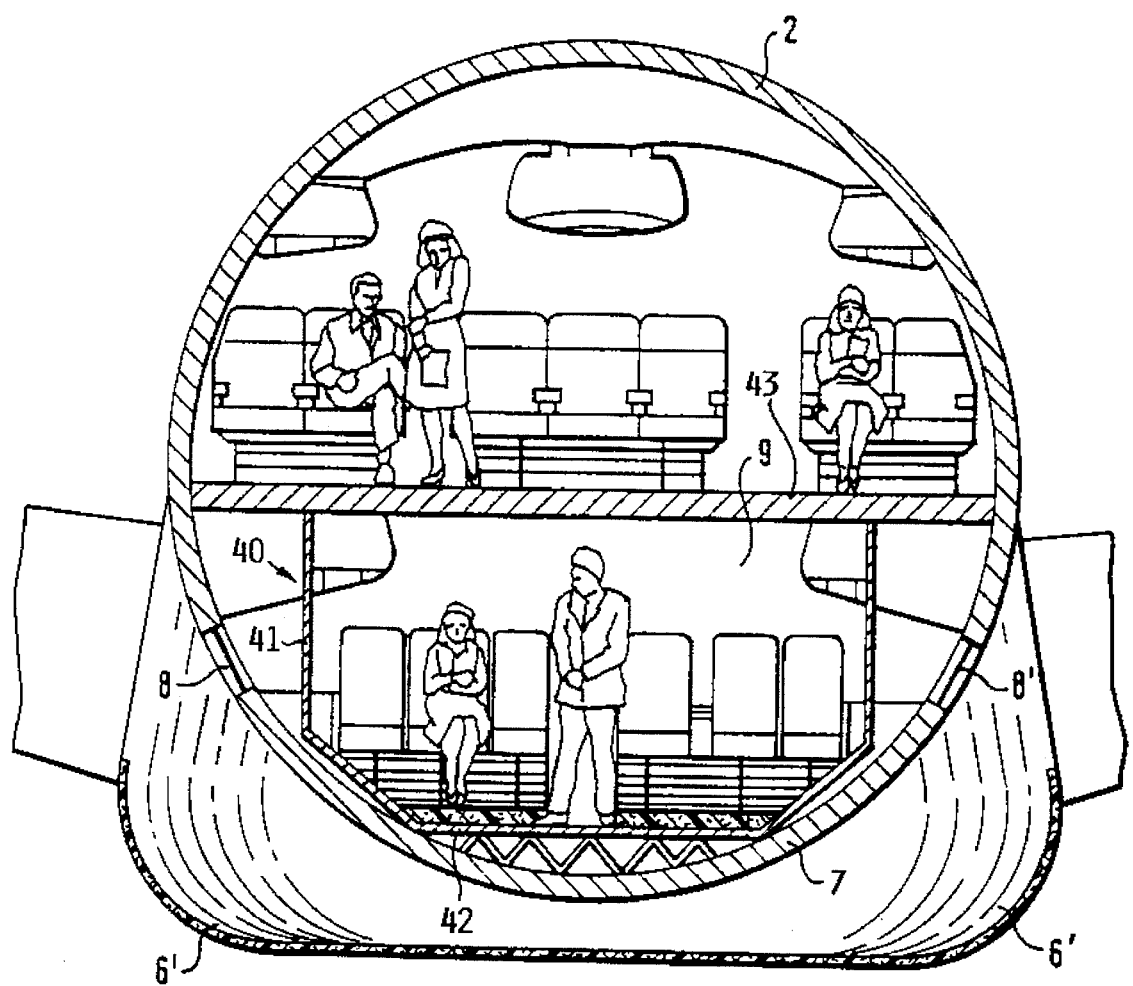
FIG. 3 is a vertical section through an aircraft, for example the aircraft of FIG. 1, taken along a vertical section plane in the area of the wings.
Figure 4:
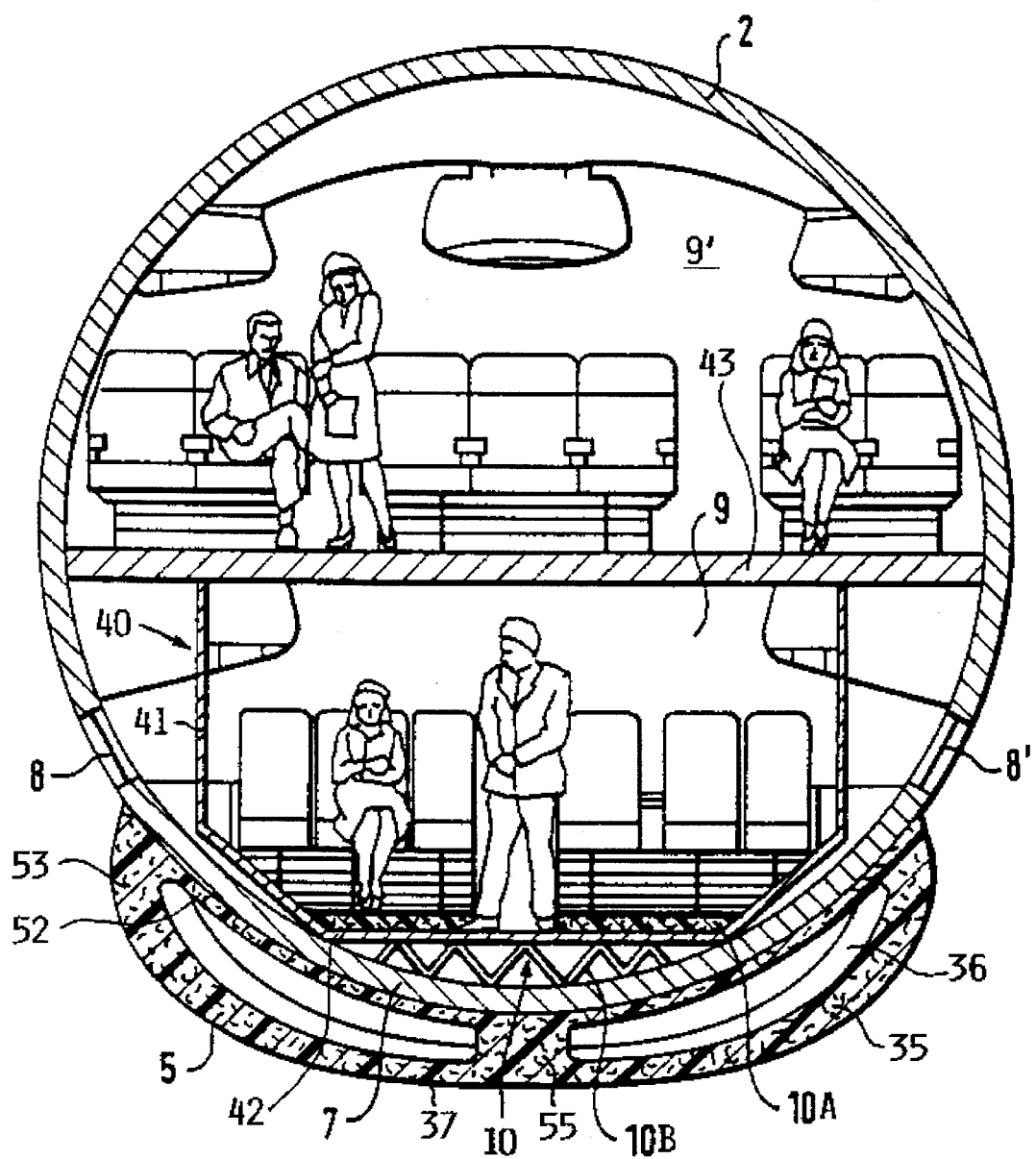
FIG. 4 is another vertical section through an aircraft, but taken along a vertical section plane in an area having the energy absorbing structural unit according to the invention attached to the fuselage belly, for example forward of the wing in FIG. 1.

FIGS. 3 and 4 each show a vertical section through a passenger aircraft such as the aircraft 1 shown in FIG. 1. Thus, the section plane is essentially perpendicular to the lengthwise axis of the aircraft. FIG. 3 shows a vertical section through a multi-deck passenger aircraft in the area of the wings. As shown in FIG. 3, aircraft of this type typically have a belly fairing including at least two bulge portions 6 and 6' that form a bay to receive the landing gear. The belly fairing 6, 6' thus protrudes beyond the substantially cylindrical shape of the fuselage 2.

The section shown in FIG. 3 is taken on a section plane at an area of the aircraft 1, for example shown in FIG. 1, not having an energy absorbing structural unit 5 attached to the fuselage. On the other hand, FIG. 4 shows a vertical section through an aircraft taken along a section plane at a location at which an energy absorbing structural unit 5 is provided. More specifically, the structural unit 5 is attached to the fuselage belly 7 of the fuselage 2. The energy absorbing structural unit 5 is arranged so as not to block the windows 8 and 8' provided through the fuselage 2.

A partition floor 43 extending substantially across the space within the fuselage 2 forms an upper deck with a passenger cabin 9' on the upper deck, and a lower deck with a passenger cabin 9 formed below the partition floor 43. The passenger cabin 9 on the lower deck of the aircraft is defined or bounded within a passenger compartment module 40 including passenger compartment walls 41 and a passenger compartment floor 42. Preferably, the passenger compartment walls 41 are vertically stiff and include appropriate strengthening members to help preserve the structural integrity of the passenger cabin 9 in the event of a crash or emergency landing.

It should be noted by comparing the view of FIG. 3 with the view of FIG. 4, that the provision of an energy absorbing structural unit 5 does not at all or not significantly increase the aerodynamic cross-section of the aircraft fuselage 2 because the landing gear bay fairings 6 and 6' already substantially protrude from the cylindrical fuselage 2. If the outer surface of the energy absorbing structural unit 5 is properly shaped, any change or especially any increase in the air resistance and drag of the aircraft will be insubstantial.

FIG. 4 shows one general or simple embodiment of the energy absorbing structural unit 5. In this general embodiment, the structural unit 5 comprises an upper pan member 52 and a lower pan member 53 formed of an energy absorbing material 35. An intermediate brace 55 extends between the upper and lower pan members 52 and 53, and hollow spaces 36 are formed therebetween. A cover skin 37 is arranged over the outside of the energy absorbing material 35 to form a smooth aerodynamically efficient outer surface of the aircraft. In the event of a crash or emergency landing in which the aircraft impacts on a runway surface or on the ground, the impact energy may be substantially absorbed by the energy absorbing material 35. Further energy is absorbed by the deformation of the energy absorbing structural unit 5 as the hollow chambers 36 collapse. The energy absorbing material 35 may, for example, be a honeycomb composite material or a hard cellular foam.

As further shown in FIG. 4, it is preferable that at least one energy absorbing module 10 is arranged below the passenger cabin space 9 within the fuselage belly 7 in addition to the energy absorbing structural unit 5 which is provided outside the fuselage belly 7. A preferred embodiment of the energy absorbing module 10 includes an energy absorbing underlayment 10A arranged on the passenger compartment module floor 42. The floor underlayment 10A may be covered, for example by carpeting or the like, to form the floor of the passenger cabin 9. Further damping elements, which are generally known in the aircraft construction field, can also be installed in the floor of the passenger cabin 9 to absorb a portion of the potentially arising impact energy. The energy absorbing module 10 further includes structure stiffening elements 10B that absorb a further portion of any impact energy that might arise. The structural stiffening elements 10B are, for example, arranged between the flat passenger compartment module floor 42 and the curved fuselage belly wall 7, thus below the passenger cabin space 9.

Figure 5:
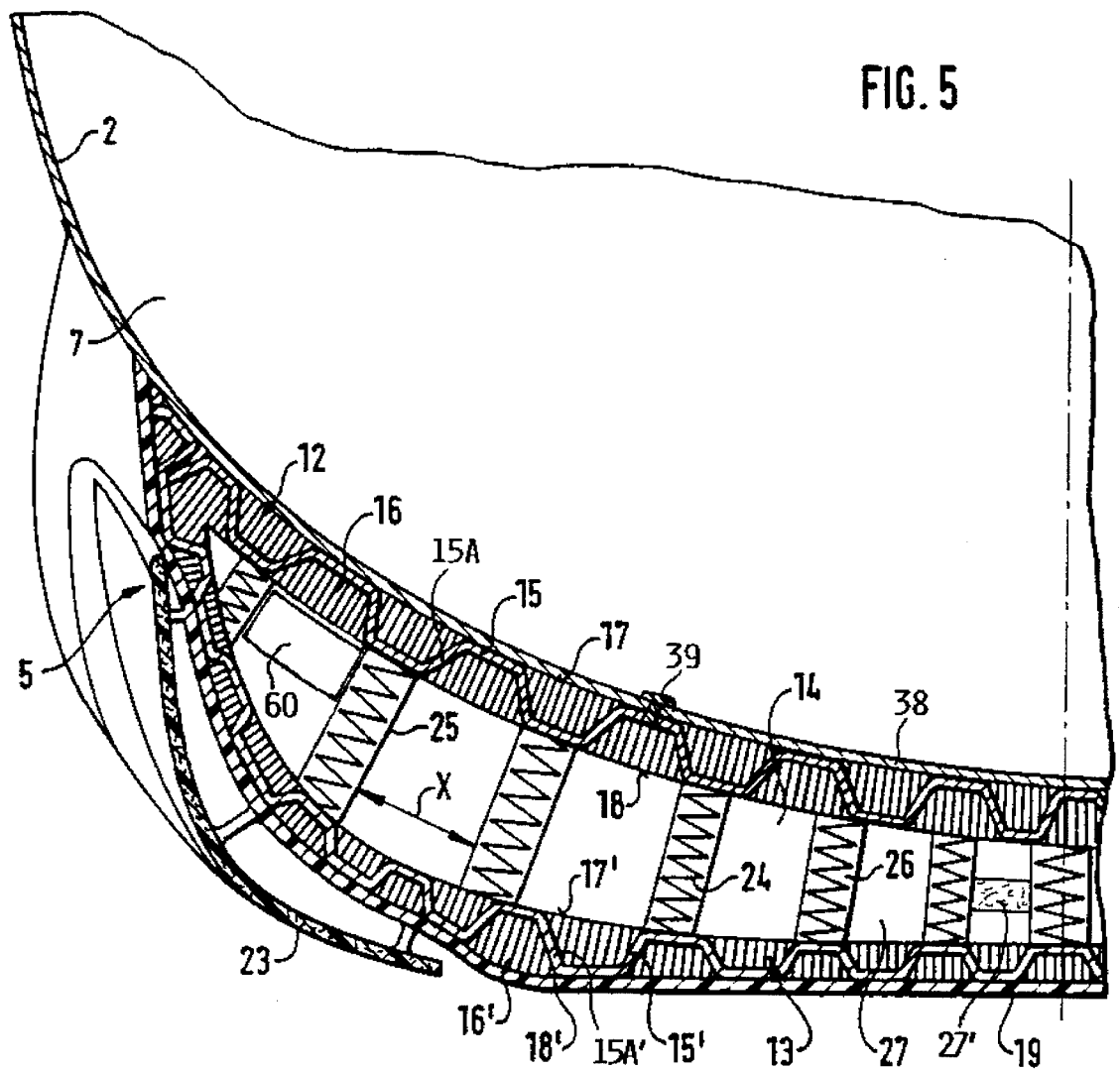
FIG. 5 is an enlarged partial vertical section through a particular embodiment of an energy absorbing structural unit according to the invention.

FIG. 5 shows another, more particular, embodiment of the energy absorbing structural unit 5. In this embodiment, the structural unit 5 essentially comprises an upper pan member 12 and a lower pan member 13. A damping packet or damping core structure 14 is enclosed between the upper and lower pan members 12 and 13. The upper pan member 12 is shaped to fit the form of the outer contour of the lower fuselage structure or fuselage belly 7. The upper pan member 12 and the lower pan member 13 together form a jacket or sheath enclosing the damping packet 14. The outer contour of the lower pan member 13 transitions smoothly into the fuselage wall 2 to form the lower outer surface of the aircraft. For this reason the outer contour of the lower pan member 13 is shaped to have an aerodynamically advantageous form in a manner that is generally known in the aircraft technology art.

The energy absorbing structural unit 5 can be manufactured by itself to form an independent structural unit. The structural unit 5 may then be attached by various means to the fuselage of either an existing operating aircraft or a new aircraft being manufactured. Because the structural unit 5 is attached to the aircraft fuselage over a large surface area, the structural unit 5 may even be attached to the fuselage 2 by a surface adhesive 38. Alternatively, or in addition, the energy absorbing structural unit 5 may be attached to the fuselage 2, i.e., fuselage belly 7 by fasteners 39 which may, for example, be screws, bolts, rivets, form-locking studs or spot welding fastening points.

The dimensions of the various components of the energy absorbing structural unit 5 are selected or calculated dependent on the expected impact energy to be absorbed in the case of a crash or emergency landing. Thus, the particular dimensions of the energy absorbing structural unit 5 are matched to the requirements for the particular aircraft.

Each of the upper and lower pan members 12 and 13 comprises at least several absorber elements 15 which are preferably vertical web sectional members 15, 15' with substantially upright webs 15A, 15A' arranged next to each other to extend substantially parallel to the lengthwise direction of the aircraft. The several vertical web sectional members 15, 15', for example, form a corrugated member 15, 15' with the corrugations extending substantially lengthwise along the fuselage. A lightweight composite material, preferably honeycomb core material 16, 16' is pressed or laid into the corrugation grooves formed between the webs 15A, 15A' of the member 15, 15'. The honeycomb core axes are preferably aligned substantially in the loading direction perpendicular to the lengthwise axis of the aircraft. The inner elements, namely the corrugated member 15, 15' and the honeycomb material inserts 16, 16' are fixed in position, strengthened by, and enclosed within an upper and lower cover layer, namely the cover layers 17 and 18 respectively in the upper pan member 12 and the cover layers 17' and 18' in the lower pan member 13. It should be noted that the corrugated member 15' and the honeycomb material inserts 16' provided in the lower pan member 13 correspond to the elements 15 and 16 as described above. Preferably, all of the cover layers 17, 17', 18 and 18' comprise fiber reinforced composite material plies.

The damping packet or damping core structure 14 enclosed between the upper and lower pan members 12 and 13 essentially comprises several absorber elements 24 and serves to absorb the major portion of impact energy in the load direction approximately perpendicular to the lengthwise axis of the aircraft. The several absorber elements 24 are arranged to extend between the upper and lower pan members 12 and 13 in the load direction substantially perpendicular to the lengthwise axis of the aircraft. Thereby, the absorber elements 24 are arranged next to one another at a lateral spacing distance x, which can vary depending on the distance from the centerline of the aircraft. This spacing x is another parameter that is selected depending on the expected impact energy loading pattern. For example, the spacing x between adjacent absorber elements 24 is less near the centerline of the aircraft and greater toward the outer edges of the energy absorbing structural unit 5.

The absorber elements 24 are preferably made of a damping material 26 which is, for example, manufactured from several layers of a fiber reinforced composite material. The layers of composite material of the damping material 26 are arranged in such a manner that loads can be absorbed substantially in a direction perpendicular to the lengthwise axis of the aircraft. The absorber elements 24 can also be constructed from metal sectional members that also have an energy absorbing characteristic in the impact load direction. Each absorber element 24 is preferably laterally stiffened and strengthened by woven web bands 25, especially comprising carbon or glass fiber reinforced composite layers 25 applied to the sides of each absorber element 24. Each absorber element 24 is attached to the upper and lower pan members 12 and 13 in such a manner that it cannot slip or buckle laterally so that it effectively absorbs energy in the loading direction.

Hollow spaces 27 are formed between adjacent absorber elements 24. The hollow spaces 27 allow deformation of the energy absorbing structural unit 5 so as to allow the further absorption of impact energy. The hollow spaces 27 can be at least partially or completely filled by supporting or energy absorbing material such as foam material or honeycomb core material. Such a material 27' provides a further stiffening and strengthening between adjacent absorber elements 24. If a honeycomb core material 27' is used, the honeycomb axes are preferably arranged substantially horizontally, that is to say perpendicularly to the load direction, which extends substantially perpendicularly to the aircraft's lengthwise axis. Such an arrangement achieves a greater stiffness of the absorber elements 24.

It is also possible to utilize at least a portion of the hollow spaces 27 for installing auxiliary fuel tanks 60. In this manner, the volume capacity for carrying fuel is also increased together with increasing the passenger capacity of the aircraft.

FIG. 5 further shows that auxiliary components of various aircraft systems, for example, an outer surface cooler 23 may be attached to or integrated with the energy absorbing structural unit 5. In such an embodiment, the auxiliary components such as the outer surface cooler 23 will also help to absorb some impact energy in the case of a crash or emergency landing.

Figure 6:
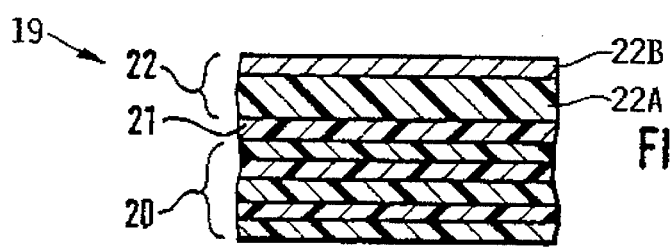
FIG. 6 is a detailed sectional view of a skid pan arrangement according to the invention.

As shown generally in FIG. 5, and more particularly in the detailed view of FIG. 6, a sliding surface layer or skid pan 19 is provided on the lower or outer cover layer 18' of the lower pan member 13, in order to strengthen the energy absorbing structural unit 5 and to serve as a sliding surface for the aircraft in a crash or emergency landing. The skid pan 19 is appropriately constructed so as to provide the proper controlled frictional braking of the aircraft or the passenger compartment in the case of a crash. Furthermore, appropriate materials or material combinations are selected and used in the skid pan 19 to correspond to the requirements in a particular case for a particular aircraft.

FIG. 6 shows a preferred embodiment of the skid pan 19. The skid pan 19 essentially comprises a plurality of fiber reinforced composite plies of which the desired or required strength and stiffness is built up by a combination of at least several normally oriented fiber reinforced composite material plies 20, at least one carbon fiber reinforced composite material ply 21, and at least one aluminum coated fiber reinforced composite ply 22. The aluminum coated ply 22 includes an aluminum coating layer 22B and a fiber reinforced composite layer 22A. The sliding surface layer or skid pan 19 is formed to cover the energy absorbing structural unit 5 and to optically and aerodynamically match or fit the outer contour of the structural unit 5 to the outer contour of the aircraft fuselage 2.

Referring again to FIG. 4 in particular, the cover skin 37 preferably forms a watertight and airtight seal to ensure that the hollow chamber 36 form buoyancy chambers, which provide additional flotation in the event of a water landing. In this case, the cover skin 37 should be elastic to withstand deformation of the structural unit 5 without tearing or puncturing. A suitable seal, and therewith the desired flotation, may be achieved with other measures, for example by providing internal seal layers, sealed buoyancy tanks or a closed cell foam, preferably a metal foam, within the structural unit 5. These measures also apply to the other embodiments of the invention, for example, the embodiment of FIG. 5.

Regarding the fuel tanks 60, it should be understood that these are preferably used as ballast or trim tanks in view of safety regulations. Thus, the tanks are empty upon take-off and landing, but fuel is pumped into the tanks during flight to achieve a desired trim. Furthermore, if necessary, the tanks may be provided with other known safety measures, such as quick drain valves. The tanks 60 also function as buoyancy tanks in a water landing.

Although the invention has been described with reference to specific example embodiments, it will be appreciated that it is intended to cower all modifications and equivalents within the scope of the appended claims.

What is claimed is:

1. A multi-deck high-capacity passenger aircraft comprising a fuselage (2) with an upper fuselage portion and a lower fuselage belly (7), a passenger deck comprising a deck floor arranged in said fuselage belly without a hold space below said deck floor and having at least one of a passenger cabin compartment (9) and a passenger service facility arranged on said passenger deck, said aircraft further comprising an energy absorbing structural unit (5) arranged outside of and attached to said fuselage belly (7) at least in an area substantially vertically below said at least one passenger cabin compartment and passenger service facility arranged on said passenger deck.

2. The passenger aircraft of claim 1, wherein said passenger deck is a lower deck and said aircraft further comprises at least one upper passenger deck arranged above said lower deck within said fuselage.

3. The passenger aircraft of claim 2, wherein said energy absorbing structural unit (5) comprises an upper pan member (12), a lower pan member (13) and a damping core structure (14) enclosed between said upper pan member (12) and said lower pan member (13), wherein said upper pan member has an upper shape mating with a bottom shape of said fuselage belly (7), and wherein said lower pan member has an aerodynamically streamlined outer contour surface, and further comprising an attachment element arranged to attach said upper pan member to said fuselage belly.

4. The passenger aircraft of claim 3, wherein said attachment element comprises an element selected from the group consisting of screws, bolts, rivets, welds, form-locking studs and adhesive layers.

5. The passenger aircraft of claim 4, wherein said attachment element is an adhesive layer.

6. The passenger aircraft of claim 3, wherein said upper pan member and said lower pan member comprise energy absorbing material and wherein said damping core structure comprises at least one intermediate brace extending between said upper pan member and said lower pan member and said damping core structure has hollow chambers formed between said upper and lower pan members.

7. The passenger aircraft of claim 3, wherein each of said upper and lower pan members (12, 13) comprises an upper cover layer (17, 17'), a lower cover layer (18, 18'), a first absorber element (15, 15') arranged between said upper and lower cover layers, said first absorber element (15, 15') comprising webs (15A, 15A') extending substantially between said upper and lower cover layers and forming channels between adjacent ones of said webs, and lightweight composite material inserts (16, 16') arranged in at least a portion of said channels.

8. The passenger aircraft of claim 7, wherein said first absorber element (15, 15') is a corrugated member, with said webs and said channels extending lengthwise in a direction substantially parallel to a longitudinal axis of said aircraft.

9. The passenger aircraft of claim 7, wherein said lightweight composite material inserts (16, 16') comprise honeycomb core material inserts, wherein longitudinal core axes of said honeycomb core material inserts are directed substantially parallel to a loading direction extending between said upper and lower cover layers and perpendicular to a longitudinal axis of said aircraft.

10. The passenger aircraft of claim 7, further comprising a skid pan (19) arranged on said outer contour surface of said lower pan member (13), said skid pan (19) comprising a plurality of fiber reinforced composite material plies (20, 21) and an outer skid layer (22) comprising a fiber reinforced composite material ply (22A) coated with an aluminum skin layer (22B).

11. The passenger aircraft of claim 10, wherein said plurality of fiber reinforced composite material plies (20, 21) comprises at least one carbon fiber reinforced ply (21).

12. The passenger aircraft of claim 3, further comprising a skid pan (19) arranged on said outer contour surface of said lower pan member (13), said skid pan (19) comprising a plurality of fiber reinforced composite material plies (20, 21) and an outer skid layer (22) comprising a fiber reinforced composite material ply (22A) coated with an aluminum skin layer (22B).

13. The passenger aircraft of claim 3, wherein said damping core structure (14) comprises a plurality of second absorber elements (24) arranged next to one another with a lateral spacing therebetween, wherein each said second absorber element is attached to said upper and lower pan members (12, 13) and extends between said upper and lower pan members (12, 13) substantially in a load bearing direction perpendicular to a longitudinal axis of said aircraft, and wherein said damping core structure further comprises stiffening bands (25) applied on lateral sides of said second absorber elements (24) to laterally stiffen said second absorber elements.

14. The passenger aircraft of claim 13, wherein said stiffening bands (25) comprise a woven web material selected from the group consisting of carbon fiber reinforced composite material plies and glass fiber reinforced composite material plies.

15. The passenger aircraft of claim 13, wherein said damping core structure (14) further comprises supporting material inserts (27') arranged in at least a portion of hollow chambers (27) formed between adjacent ones of said second absorber elements (24).

16. The passenger aircraft of claim 15, wherein said supporting material inserts (27') comprise a material selected from the group consisting of foam materials and honeycomb core materials.

17. The passenger aircraft of claim 13, further comprising a fuel tank (60) arranged in a hollow chamber (27) formed between adjacent ones of said second absorber elements (24).

18. The passenger aircraft of claim 1, wherein cut-outs (11A, 11B) are provided through said energy absorbing structural unit (5) in areas of doors provided in said fuselage to allow unhindered operation of said doors.

19. The passenger aircraft of claim 1, further comprising an aircraft system component (23) of said aircraft integrated into said energy absorbing structural unit (5).

20. The passenger aircraft of claim 19, wherein said aircraft system component (23) comprises an outer surface cooling panel (23).

21. The passenger aircraft of claim 1, further comprising an energy absorbing module (10) arranged inside said fuselage belly (7) at least in an area substantially vertically below said at least one passenger cabin compartment and passenger service facility arranged on said passenger deck.

22. The passenger aircraft of claim 21, wherein said energy absorbing module (10) comprises an energy absorbing underlayment (10A) arranged on said deck floor.

23. The passenger aircraft of claim 21, wherein said energy absorbing module (10) comprises structural stiffening members (10B) arranged between said deck floor and said fuselage belly.

24. The passenger aircraft of claim 2, further comprising a passenger compartment module arranged on said passenger deck and comprising passenger compartment walls (41) and a passenger compartment floor (42) forming at least a portion of said deck floor of said passenger deck.

25. An energy absorbing structural unit configured and adapted to be attached to the outside of a convex curved fuselage belly of a high-capacity passenger aircraft, said structural unit (5) comprising an upper pan member (12), a lower pan member (13) and a damping core structure (14) enclosed between said upper pan member (12) and said lower pan member (13), wherein said upper pan member has a concave curved shape adapted to mate with the convex curved shape of the fuselage belly, and wherein said lower pan member has an aerodynamically streamlined outer contour surface.

26. The energy absorbing structural unit of claim 25, wherein each of said upper and lower pan members (12, 13) comprises an upper cover layer (17, 17'), a lower cover layer (18, 18'), a first absorber element (15, 15') arranged between said upper and lower cover layers, said first absorber element comprising webs (15A, 15A') extending substantially between said upper and lower cover layers and forming channels between adjacent ones of said webs, and lightweight composite material inserts (16, 16') arranged in at least a portion of said channels.

27. The energy absorbing structural unit of claim 26, further comprising a skid pan (19) arranged on said outer contour surface of said lower pan member (13), said skid pan (19) comprising a plurality of fiber reinforced composite material plies (20, 21) and an outer skid layer (22) comprising a fiber reinforced composite material ply (22A) coated with an aluminum skin layer (22B).

28. The energy absorbing structural element of claim 26, wherein said damping core structure (14) comprises a plurality of second absorber elements (24) arranged next to one another with a lateral spacing therebetween, wherein each said second absorber element is attached to said upper and lower pan members (12, 13) and extends between said upper and lower pan members (12, 13) substantially in a load bearing direction perpendicular to a longitudinal axis of said aircraft, and wherein said damping core structure further comprises stiffening bands (25) applied on lateral sides of said absorber elements (24) to laterally stiffen said absorber elements.

29. The energy absorbing structural unit of claim 25, further comprising a seal member enclosing a buoyancy space therein.

30. The passenger aircraft of claim 1, wherein said fuselage belly has a curved cross-section with a convex curved outer surface, and said energy absorbing structural unit has a concave upper surface adapted to mate with said convex outer surface of said fuselage belly.

31. The passenger aircraft of claim 1, wherein said fuselage has a substantially circular cross-section, and said energy absorbing structural unit forms a bulge deviating and protruding outwardly from said substantially circular cross-section.

32. The passenger aircraft of claim 1, wherein said energy absorbing structural unit and said fuselage are independent non-integral components, and said energy absorbing structural unit is removably attached to said fuselage belly.

33. The passenger aircraft of claim 1, wherein said energy absorbing structural unit is wider than said deck floor and extends upward along the outside of said fuselage belly to areas above and laterally to the sides of said deck floor.

34. The passenger aircraft of claim 1, wherein said energy absorbing structural unit has a sufficient energy absorbing characteristic so that said passenger deck is suitable for passenger occupancy during all phases of flight of said aircraft.

* * * * *